United States Patent [19]  
Gobel et al.

[11] Patent Number: 4,880,867  
[45] Date of Patent: Nov. 14, 1989

[54] AQUEOUS COATING COMPOSITIONS, A PROCESS FOR THEIR PREPARATION AND METHOD OF USING THE SAME

[75] Inventors: Armin Gobel, Wuppertal; Knut Graff, Hattingen; Hans-Ulrich Meier, Essen; Hans-Peter Patzschke, Wuppertal, all of Fed. Rep. of Germany

[73] Assignee: 501 Herberts Gesellschaft mit Beschrankter, Wuppertal, Fed. Rep. of Germany

[21] Appl. No.: 86,905

[22] Filed: Aug. 18, 1987

[30] Foreign Application Priority Data

Aug. 19, 1986 [DE] Fed. Rep. of Germany ....... 3628125

[51] Int. Cl.$^4$ ............................................... C08L 75/00
[52] U.S. Cl. ...................................... 524/507; 524/523
[58] Field of Search ................................ 524/507, 523

[56] References Cited

U.S. PATENT DOCUMENTS

| | | | |
|---|---|---|---|
| 3,862,074 | 1/1975 | Hickey | 524/507 |
| 3,907,737 | 9/1975 | Marx et al. | 524/507 |
| 4,046,729 | 9/1977 | Scriven et al. | 524/589 |
| 4,066,591 | 1/1978 | Scriven et al. | 524/840 |
| 4,103,050 | 7/1978 | Laskin et al. | 524/507 |
| 4,108,811 | 8/1978 | Eckhoff | 524/507 |
| 4,119,602 | 10/1978 | Isgur et al. | 524/507 |
| 4,177,183 | 12/1979 | Dalibor | 524/507 |
| 4,198,330 | 4/1980 | Kaizerman et al. | 525/185 X |
| 4,209,435 | 6/1980 | Backhouse | 524/504 |
| 4,339,365 | 7/1982 | Becher et al. | 524/507 |
| 4,403,003 | 9/1983 | Backhouse | 427/407.1 |
| 4,442,248 | 4/1984 | Kanda et al. | 524/507 |
| 4,489,135 | 12/1984 | Drexler et al. | 428/423.1 |
| 4,507,426 | 3/1985 | Blake, Jr. | 524/507 |
| 4,510,275 | 4/1985 | Ihikura et al. | 524/507 |
| 4,539,363 | 9/1985 | Backhouse | 524/560 |
| 4,558,090 | 12/1985 | Drexler et al. | 524/591 |
| 4,576,979 | 3/1986 | Schupp et al. | 524/507 |
| 4,576,987 | 3/1986 | Crockatt et al. | 524/507 |
| 4,594,374 | 6/1986 | Stahl et al. | 524/507 |
| 4,622,360 | 11/1986 | Gomi et al. | 524/507 |

FOREIGN PATENT DOCUMENTS

| | | | |
|---|---|---|---|
| 3316550 | 11/1984 | Fed. Rep. of Germany | 524/507 |
| 3440534 | 5/1986 | Fed. Rep. of Germany | 524/507 |
| 3440535 | 5/1986 | Fed. Rep. of Germany | 524/507 |
| 0107036 | 8/1975 | Japan | 524/507 |
| 0021230 | 2/1978 | Japan | 524/507 |
| 0061050 | 4/1982 | Japan | 524/507 |
| 1057655 | 3/1986 | Japan | 524/507 |
| 0715593 | 2/1980 | U.S.S.R. | 524/507 |
| 1530186 | 10/1978 | United Kingdom | 524/507 |

*Primary Examiner*—Joseph L. Schofer  
*Assistant Examiner*—J. M. Reddick  
*Attorney, Agent, or Firm*—Michael O. Warnecke; Donald A. Peterson

[57] ABSTRACT

An aqueous coating composition is provided which comprises a film forming material based on water dilutable binders which are comprised of a mixture of (A) 90 to 40% by weight of hydroxyl group-containing polymer resin; (B) 10 to 60% by weight of polyurethane dispersion and (C) pigments; as well as optionally conventional solvents, auxiliary agents, and additives. The process for the preparation of the coating composition and a method for the application of the coating composition are also described.

5 Claims, No Drawings

AQUEOUS COATING COMPOSITIONS, A PROCESS FOR THEIR PREPARATION AND METHOD OF USING THE SAME

BACKGROUND OF THE INVENTION

1. Field of the Invention

This invention relates to aqueous nonyellowing coating compositions usable, for example, for top coat lacquers. They may be used as water dilutable uni- or metallic base coats and covered in the usual manner by spraying with a clear lacquer which is dilutable with the water or dissolved in organic solvents. The binders may be used as industrial lacquers, especially, for example, in the motor car industry. They result in coatings which in addition to providing a good optical effect and having excellent mechanical properties can be applied trouble free by electrostatic spraying, e.g. with high rotation spray apparatus. They are also suitable for repair purposes as they provide excellent properties even when hardened only at low temperatures such as 80° C.

2. Description of the Related Art

Conventional water dilutable polyacrylate resins have a comparatively low molecular weight and contain numerous hydrophilic groups. The addition of neutralizing agents results in polycarboxylic acid salts which are soluble in water or dilutable with water. These resins must be cross-linked with cross-linking agents such as melamine resins and/or blocked polyisocyanates at elevated temperatures. These reactions proceed so slowly at temperatures below 100° C. that the films show loss of adherence to their base or blistering on the surface when exposed to moisture.

Resins having a relatively high molecular weight are prepared by emulsion polymerization in an aqueous medium. The addition of surface active agents or emulsifiers gives rise to problems in the water resistance of the films. Electrostatic spraying entails difficulties owing to their tendency to coagulate.

Water dilutable binder systems containing polymer microparticles which are insoluble in nonaqueous solvents and water are described in DE-OS No. 28 60 661 (U.S. Pat. No. 4,209,435). They are prepared with the aid of polymeric steric dispersion stabilizers by polymerization in nonaqueous solvents and subsequently converted into the aqueous medium. This conversion process is highly complicated and susceptible to trouble because the action of the dispersion stabilizer is impaired by variations in the manufacturing process. In EP-A-38127, these binders are used for the preparation of metallic base coats, the aluminum platelets or pigments being introduced into the lacquer by means of a melamine resin.

Primers for metal coils based on acrylate resin/polyurethane dispersions are described in DE-PS 27 36 542 (U.S. Pat. No. 4,103,050). No special acrylate resins adjusted to the requirements of metal base coats are mentioned. DE-OS 23 63 307 describes the emulsion polymerization of vinyl monomers in polyurethane dispersions. These vinyl monomers may be acrylate esters; the use of vinyl monomers containing free carboxyl groups is not mentioned, nor is there any mention of special requirements for metallic base coats. The high molecular weight products obtained by emulsion polymerization are used as modified polyurethane rubbers.

In DE-OS No. 32 10 051, water dilutable polyurethane dispersions are used for the preparation of metallic base coats. The films obtained from them are generally too soft and must therefore be cross-linked with melamine resins. It is therefore difficult to obtain suitable water resistant film properties at the low temperatures which are necessary for repairs. Electrostatic spraying also gives rise to difficulties.

The problem therefore existed of providing a binder system which would to a large extent be physically drying and would not have the disadvantages mentioned above.

SUMMARY OF THE INVENTION

This invention relates to aqueous coating compositions which comprise a film forming material based on water dilutable binders which are comprised of a mixture of (A) 90 to 40% by weight of hydroxyl group-containing polymer resin; (B) 10 to 60% by weight of polyurethane dispersion and (C) pigments; as well as optionally conventional solvents, auxiliary agents, and additives, a process for the preparation of the coating compositions and a method for the application of the coating composition.

DETAILED DESCRIPTION OF THE INVENTION

This problem has surprisingly been solved by the following binder composition which is contained in the coating composition according to the invention and is comprised of a mixture of (A) 90 to 40% by weight of hydroxyl group-containing polymer resin having
  (a) a number average molecular weight (Mn) of from 10,000 to 500,000,
  (b) a glass transition temperature of from $-50°$ to $+150°$ C.,
  (c) an acid number of from 0 to 80 (mg KOH per g of solid resin),
  (d) a hydroxyl number of from 60 to 250 (mg KOH per g of solid resin) and
  (e) a viscosity of from 5 to 100 Pa.s; and (B) 10 to 60% by weight of polyurethane dispersion, the quantitative proportions of (A) and (B) being based on the solids content of (A) and (B) and their sum being always 100%, and is further comprised of pigments and optionally conventional solvents and auxiliary substances and additives.

It is preferred to use
80 to 60% by weight of component (A) and
20 to 40% by weight of component (B).

Components (A) and (B) are preferably free from emulsifiers. Component (B) is preferably a polyurethane dispersion containing urea groups. Component (A) or (B) may also consist of mixtures of the corresponding types of resin.

Component (A), the polymer resin of the coating compound according to the invention, preferably has a number average molecular weight of from 40,000 to 200,000. The number average molecular weight is determined by gel permeation chromatography, based on polystyrene. The upper limit of the molecular weight is preferably 2,000,000, in particular 1,000,000. Preferably, virtually no water soluble micro gel particles are present. The glass transition temperature is preferably at $-15°$ to 100° C. and most preferably at $+20°$ to $+50°$ C. The glass transition temperature is calculated from the glass transition temperatures of the homopolymers.

The acid number of the polymer resin used as component (A) is from 0 to 80 (mg KOH per g of solid resin)

and in particular from 5 to 50. The hydroxyl number is from 60 to 250 (converted into mg KOH per g of solid resin), in particular from 80 to 200.

The viscosity of component (A) is from 5 to 100 Pa.s, in particular from 10 to 50 Pa.s, determined in a 50% solution in butoxyethanol at 25° C.

The invention provides a physically drying binder system for aqueous coating compounds capable of being sprayed electrostatically without any sign of coagulation. This spraying may be carried out, for example, by means of high rotation bells. Excellent coatings are obtained. It has been shown that when force dried at temperatures in the region of, for example, 80° C., the coatings obtained will withstand storage in water without any appearance of defects on the surface or loss of adhesion. In addition, the polymer resins or polyacrylate resins used are eminently suitable for use as grinding binders for pigments. Pastes which are highly transparent and have a great depth of color are obtained both with organic and with inorganic pigments. The pastes have high storage stability. It is possible by these means to produce both metallic base lacquers and uni lacquers in which the grinding binder becomes an integral component of the base lacquer formulation. This constitutes a great advantage over dispersions and emulsions which are unsuitable for use as grinding resins, partly owing to their lack of shearing stability (high shearing forces are produced in the process of dispersion in sand mills or pearl mills). In such cases it has hitherto been necessary to resort to special grinding binders for the preparation of tinted metallic lacquers or uni lacquers, but these binders had a deleterious effect on the properties of the lacquers. The tinting pastes obtained by grinding up with the polyacrylate resin according to the invention are eminently suitable for tinting or adjusting the tint of metallic lacquers.

The polymer resins used as component (A) according to the invention are preferably poly(meth)acrylate resins. The expression "Poly(meth)acrylate" as used herein, is intended to encompass polyacrylates and polymethacrylates. They may be prepared in water dilutable organic solvents at temperatures of 50° to 160° C. with the aid of radical catalysts without the use of emulsifiers, dispersion stabilizers and/or protective colloids. It is important to obtain an average molecular weight which is high for solution polymerization, as indicated above and as is recognized by the high viscosity of the solution.

In solution polymerization, an increase in viscosity is normally obtained by reducing the quantity of catalyst. The polymerization yield then becomes incomplete due to the high solvent content and the stabilizers present in the monomers. A better solution is found in the combination of a relatively high catalyst content with the addition of polyunsaturated monomers. Instead of these polyunsaturated monomers, it is possible to incorporate monomers containing reactive groups, which then react with one another during polymerization so that the polyunsaturated monomer is produced "in situ". By suitable choice of the acid numbers and hydroxyl numbers, the required number of hydrophilic groups can be introduced into the molecule so that after neutralization with basic compounds the substance can be diluted with water to a solids content of from 15 to 45% by weight. A high hydroxyl number should be used if the acrylate resin has a low acid number and conversely. Thus, for example, a water dilutable product can be obtained with an acid number of 20 and a hydroxyl number of 150.

The composition of the poly(meth)acrylate resin (component (A) preferably is comprised of
(a) 0 to 12% by weight, preferably 1 to 10% by weight of α, β-unsaturated carboxylic acids,
(b) 10 to 65% by weight, preferably 15 to 50% by weight of hydroxyl group-containing monomers capable of being incorporated by polymerization, most preferably ethylenically monounsaturated monomers containing hydroxyl groups,
(c) 0.1 to 7% by weight, preferably 0.5 to 5% by weight, more preferably 1.0 to 3% by weight of polyunsaturated monomers, most preferably, ethylenically polyunsaturated monomers and
(d) 16 to 90% by weight, preferably 35 to 85% by weight of unsaturated, most preferably ethylenically unsaturated monomers which contain no reactive groups other than the unsaturated bond.

The ethylenically unsaturated monomers may be virtually any monomers capable of free radical polymerization but the usual restrictions for copolymerizations apply, as prescribed by the Q- and e-scheme of Alfrey and Price or the copolymerization parameters (see e.g. Brandrup and Immergut, Polymer Handbook, 2nd ed. John Wiley & Sons, New York (1975)).

The α, β-unsaturated carboxylic acids used are monomers represented by the general formula

R—CH=CR'—COOH wherein
R=H, COOH, $C_nH_{2n+1}$ or $COOC_nH_{2n+1}$
R'=H or $C_nH_{2n+1}$'
n=1 to 6.

Examples of these monomers are acrylic acid, methacrylic acid, crotonic acid, fumaric acid, maleic acid monoalkyl esters and itaconic acid monoalkyl esters. Acrylic acid and methacrylic acid are preferred.

Hydroxyl group-containing monomers capable of being incorporated by polymerization are understood to be compounds which in addition to containing a polymerizable, ethylenically unsaturated group contain at least one hydroxyl group on a $C_2$ to $C_{20}$ carbon structure. They are mainly unsaturated esterification products corresponding to the general formula

R''—CH=CR'—X—R''' wherein, in addition to the meanings given above, R'''=R'or $COOC_nH_{2n+}$, R'''=a straight chained or branched $C_{1-6}$ alkyl group having 1 to 3 OH groups and X=COO, CONH, $CH_2O$ or O.

Particularly suitable are (meth)acrylic acid hydroxyalkyl esters such as β-hydroxyethyl acrylate, β-hydroxypropyl methacrylate, butane diol-1,4-monoacrylate, propyleneglycol monoacrylate, 2,3-dihydroxy-propyl methacrylate, pentaerythritol monomethacrylate or polypropyleneglycol monoacrylate and fumaric acid dihydroxyalkyl esters in which the straight chained, branched or cyclic alkyl group contains 2 to 20 carbon atoms. N-hydroxyalkyl (meth) acrylamides and N-hydroxyalkyl fumaric acid mono- or diamides may also be used, e.g. N-hydroxyethyl acrylamide or N-(2-hydroxypropyl)-methacrylamide. Particularly elastic properties may be obtained by using the reaction product of hydroxyalkyl (meth)acrylate and ε-caprolactone. Other hydroxyl group- containing compounds include allyl alcohol, monovinyl ethers of polyols, especially diols, such as monovinyl ethers of ethyleneglycol and butane diol, and hydroxyl group- containing allyl ethers or esters such as 2,3-dihydroxypropyl-monoallyl ether, trimethylolpropane-monoallyl ether or 2,3-dihydroxypropanoic acid allyl ester. Hydroxyalkyl (meth)acrylates are particularly suitable, e.g. hydroxyethyl (meth)acrylate.

The hydroxyl groups may also be incorporated by the reaction of carboxyl group- containing copolymers with alkylene oxides such as ethylene oxide, propylene oxide or butylene oxide.

By "ethylenically polyunsaturated monomers" are meant compounds having at least two radically polymerizable double bonds corresponding to the general formula $R-CH=CR'-B-(CR'=CH-R)_m$ where $m=1$ to 3, preferably $m=1$ and, in addition to the meanings indicated above, B represents the general basic chemical structure bearing the reactive double bond. Examples of groups denoted by B include the o-,m- and p-phenyl group and groups of the formula $-X-$alkyl$-X'-$wherein the alkyl group preferably has 2 to 18 carbon atoms and X and X' are identical or different compounds, e.g., O, CONH, COO, NHCOO or NH—CO—NH. B may represent, for example, a benzene ring as in divinylbenzene which may or may not be substituted, such as p-methyl-divinylbenzene or o-nonyldivinylbenzene.

Other suitable polyunsaturated monomers include reaction products of polyalcohols, especially dihydric alcohols, with $\alpha, \beta$-unsaturated carboxylic acids as already defined above. The following are examples: ethanediol diacrylate, ethyleneglycol dimethacrylate, 1,4-butanediol diacrylate, 1,6-hexanediol diacrylate, neopentylglycol dimethacrylate, triethyleneglycol dimethacrylate, polyglycol-400-diacrylate, glycerol dimethacrylate, trimethylolpropane triacrylate and/or pentaerythritol diacrylate. Polyfunctional monomers containing urethane groups and amide groups are prepared by the reaction of, for example, hexane diisocyanate or methacrylic acid $\beta$-isocyanatoethyl ester with hydroxyethyl (meth)acrylate or (meth)acrylic acid. Examples of suitable compounds having a different structure are: allyl methacrylate, diallyl phthalate, butanediol divinyl ether, divinylethylene urea, divinylpropylene urea, maleic acid diallyl ester, bismaleic imides, glyoxabis-acrylamide and/or the reaction product of an epoxide resin with (meth)acrylic acid or fumaric acid semi esters. The use of difunctional unsaturated monomers such as butanediol diacrylate or hexanediol diacrylate is preferred. When glycidyl methacrylate and methacrylic acid are used, the corresponding glyceric dimethacrylate is automatically formed in the process of polymerization. The nature and quantity of polyunsaturated monomers and the reaction conditions (catalysts, reaction temperature, solvents) should be carefully adjusted to one another so that the desired high viscosity may be obtained without gel formation.

The unsaturated monomers which contain no additional reactive groups are chosen according to the mechanical properties and the properties of compatibility. Acrylic acid alkyl esters, methacrylic acid alkyl esters and/or maleic acid or fumaric acid dialkyl esters are used in which the alkyl groups have 1 to 20 carbon atoms and are arranged as a straight or branched aliphatic chain and/or as a cycloaliphatic and/or (alkyl)aromatic group. Examples of "hard" monomers whose polymers have a high glass transition temperature include monomers of the vinyl-o-, m- or p- aromatic type such as styrene, $\alpha$-substituted styrenes such as $\alpha$-methylstyrene, o-, m- or p-alkylstyrenes such as vinyl toluene or p-tert.-butylstyrene, halogenated vinylbenzenes such as o- or p-chlorostyrene, short chained methacrylic acid esters such as methylmethacrylate, ethylmethacrylate, propylmethacrylate or butylmethacrylate, cyclohexyl methacrylate, isobornyl methacrylate, dihydrodicyclopentadienyl methacrylate, (meth)acrylamide and/or (meth) acrylonitrile. Examples of "soft" monomers are: acrylic acid esters having a long alcohol chain, such as n-butylacrylate, isobutylacrylate, tert.-butylacrylate and/or 2-ethyl-hexyl acrylate. Unsaturated ethers such as ethoxyethyl methacrylate or tetrahydrofurfurylacrylate may also be used. A certain proportion of monomers of the vinyl ester type, particularly vinyl esters themselves, may be used under suitable reaction conditions. The following are examples of preferred monomer combinations: acrylate and/or methacrylate monomers, (meth)acrylic acid, hydroxyalkyl (meth)acrylic acid esters as mono olefinically unsaturated compounds and divinylbenzene, butanediol diacrylate and hexanediol diacrylate as polyunsaturated compounds.

Copolymerization is carried out in known manner by solution polymerization with the addition of radical initiators and optionally molecular weight regulators. It is carried out in a liquid which acts as solvent for the monomer and keeps the resulting polymer in a state of solution. The monomer and polymer content amounts to about 30 to 70% by weight. Solution polymerization in organic solvents which are dilutable with water is preferred. Examples of such solvents include ethyleneglycol, ethoxyethanol, butoxyethanol, diethyleneglycol, triethyleneglycol, diethyleneglycoldimethyl ether, propyleneglycol, ethoxypropanol, methoxypropanol, dipropyleneglycol monomethyl ether, dipropyleneglycol dimethyl ether, diacetone alcohol, ethanol, isopropanol, n-butanol, sec-butanol, tert.butanol, acetone, methoxypropanone, dioxane, tetrahydrofuran, N-methylpyrrolidone and mixtures thereof. A certain amount of high-boiling, water insoluble solvent such as hexyleneglycol, phenoxyethanol or 2,2,4-trimethyl-pentanediol-1,3-monoisobutyrate may be added to improve the levelling properties. The solvent or solvent mixture is generally heated to the reaction temperature and the monomer mixture is then run in over a period of several hours. In order that the reaction may be carried out at the reflux temperature, the initiator is adjusted to the boiling point of the solvent mixture. It generally decomposes with a half life of 30 minutes to 10 hours. The initiator is either dissolved cold in the monomer mixture or for safety reasons is added separately during the inflow of monomer mixture. Peroxides and/or azo compounds are added as catalysts which are soluble in organic solvents. They are used in quantities of 0.1 to 5% by weight, preferably 0.5 to 3% by weight, based on the quantity of monomers. The peroxides used may be, for example, benzoyl peroxide or di-tert.-butyl peroxide, hydroperoxides such as tert.-butylhydroperoxide or cumenehydroperoxide or per esters such as tert.butylperoctoate or tert.-butylperbenzoate. Examples of azo compounds which are decomposed by heat include 2,2'-azo-bis-(2-cyanopropane), 1,1'-azo-bis-cyclohexane carbonitrile and 4,4'-azo-bis-(4-cyanopentanoic acid). The molecular weight may be lowered in known manner by means of molecular weight regulators. These are preferably mercaptans, halogenated compounds and other radical transmitting substances. Regulators which are particularly preferred are n- and tert.-dodecylmercaptan, tetrakis-mercaptoacetyl-penta-erythritol, tert.-butyl-o-thiocresol, thiosalicylic acid, mercaptoacetic acid, buten-1-ol and dimeric α-methylstyrene.

To convert the emulsifier-free poly(meth)acrylate resin into an aqueous solution or dispersion, the carboxyl groups are neutralized and then diluted with water. Suitable neutralizing agents are: ammonia, primary, secondary and tertiary alkylamines and alkanolamines, amino ethers and quaternary ammonium hydroxides. The following are examples: diethylamine, triethylamine, propylamine, butylamine, dimethylaminoethanol, diisopropanolamine, triethanolamine, triisopropanolamine, 2-amino-2-methyl-l-propanol, 2-di-methylamino-2-methylpropanol-1, morpholine and methylmorpholine. The choice of amine neutralizing agent influences the stability of the aqueous dispersion and must be tested accordingly. Ammonia, triethylamine, dimethylaminoethanol and N-methyl-morpholine are preferred owing to their high volatility. The upper limit of the quantity of amine added depends on the 100% degree of neutralization of the carboxyl groups present. The lower limit depends on the stability of the dispersion obtained. The pH of the neutralized coating compound should be about 6.5 to 8.5. If the pH is too low, dispersion difficulties arise and the resin precipitates. Low boiling solvents may be removed by distillation under normal pressure or under vacuum, if necessary preceded by neutralization and dilution with water.

A polyurethane dispersion is used as component B. This is preferably anionic and preferably has an acid number of 5 to 50, most preferably 10 to 30, based on the solids content. Preparation of this dispersion is carried out in the usual manner by chain lengthening of a prepolymer containing isocyanate end groups, after neutralization of its acid groups, by emulsification in water with polyamines and/or hydrazine. In this process, either all the isocyanate groups react with diamines or, if relatively high molecular weight polyamines or mixtures thereof are used, amine nitrogen atoms carrying reactive hydrogen may be left over. Polyurethane dispersions containing urea groups are preferably prepared. This process gives rise to products which have improved dispersibility, i.e. the polyurethanes formed can be dispersed in water with a relatively small number of acid salt groups and form an organic phase consisting of fine particles.

The prepolymers containing isocyanate groups may be prepared by the reaction of polyhydric alcohols having a hydroxyl number of 10 to 1800, preferably 50 to 500, with excess polyisocyanates at temperatures of up to 150° C., preferably at 50° to 130° C., in organic solvents which are incapable of reacting with isocyanates. The equivalent ratio of NCO groups to OH groups lies in the range of 1.5:1.0 to 1.0:1.0 and is preferably in the range of 1.4:1 to 1.2:1. The polyols used for the preparation of the prepolymer may be of low molecular weight and/or high molecular weight but may contain relatively inert anionic groups.

Low molecular weight polyols give rise to a harder polyurethane than relatively high molecular weight polyols. Low molecular weight polyols have a molecular weight of from 60 to about 400 and may contain aliphatic, alicyclic or aromatic groups. They are used in quantities of up to 30% by weight of the total polyol constituents, preferably about 2 to 20% by weight. It is advantageous to use low molecular weight polyols containing up to about 20 carbon atoms per molecule, such as ethyleneglycol, diethyleneglycol, triethyleneglycol, 1,2-propanediol, 1,3-propanediol, 1,4-butanediol, 1,2-butyleneglycol, 1,6-hexanediol, trimethylolpropane, castor oil or hydrogenated castor oil, di-trimethylolpropane ether, pentaerythritol, 1,2-cyclohexanediol, 1,4-cyclohexanedimethanol, bisphenol A, bisphenol F, neopentylglycol, hydroxypivalic acid neopentylglycol ester, hydroxyethylated or hydroxypropylated bisphenol A, hydrogenated bisphenol A and mixtures thereof.

In order to obtain an isocyanate prepolymer with high flexibility, a high proportion of a relatively high molecular weight, straight chained polyol preferably having a hydroxyl number of from 30 to 150 should be added. Up to 97% by weight of the whole polyol may consist of saturated and unsaturated polyesters and/or polyethers with molecular weights $\overline{M}n$ of from 400 to 5000. Aliphatic polyetherdiols corresponding to the general formula

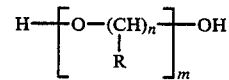

in which R=hydrogen or a lower alkyl group optionally having various substituents and n=2 to 6, preferably 3 to 4 and m=2 to 100, preferably 5 to 50, are suitable high molecular weight polyols. Examples include straight chained or branched polyetherdiols such as poly(oxyethylene)glycols, poly(oxylpropylene)glycols and/or poly(oxybutylene)glycols. The selected polyetherdiols should not introduce an excessive amount of ether groups because the polymers obtained would then swell in water. The preferred polyetherdiols are poly-(oxypropylene)glycols n the molecular weight Mn range of from 400 to 3000.

Polyesterdiols may be prepared by the esterification of organic dicarboxylic acids or their anhydrides with organic diols or they may be derived from a hydroxycarboxylic acid or a lactone. For preparing branched polyesterpolyols, a small proportion of polyols or polycarboxylic acids of a higher valency may be used. The dicarboxylic acids and diols may be straight chained or branched aliphatic, cycloaliphatic or aromatic dicarboxylic acids or diols.

The diols used for the preparation of the polyesters consist, for example, of alkylene glycols such as ethylene glycol, propyleneglycol, butyleneglycol, butanediol-(1,4), hexanediol-(1,6), neopentylglycol and other diols, such as dimethylolcyclohexane but small quantities of polyols such as trimethylolpropane, glycerol or pentaerythritol may also be added. The acid component of the polyester consists primarily of low molecular weight dicarboxylic acids or their anhydrides containing 2 to 30, preferably 4 to 18 carbon atoms in the molecule. The following are examples of suitable acids: o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerised fatty acids. Instead of these acids, their anhydrides may be used where such exists. For the formation of polyesterpolyols, minor quantities of carboxylic acids having 3 or more carboxyl groups may be present, for example trimellitic acid anhydride or the adduct of maleic acid anhydride and unsaturated fatty acids.

Polyesterdiols obtained by the reaction of a lactone with a diol are also used according to the invention.

They are distinguished by the presence of hydroxyl end groups and recurrent polyester units of the formula

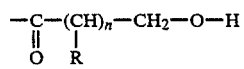

in which n is preferably 4 to 6 and the substituent denoted by R is hydrogen or an alkyl, cycloalkyl or alkoxy group.

No substituent contains more than 12 carbon atoms. The total number of carbon atoms in the substituent does not exceed 12 per lactone ring. Examples are hydroxycaproic acid, hydroxybutyric acid, hydroxydecanoic acid and/or hydroxystearic acid. The lactone used as starting material may be represented by the following general formula:

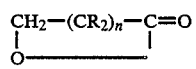

wherein n and R have the meanings already indicated.

The polyesterdiols are preferably prepared from the unsubstituted ε-caprolactone in which n has the value 4 and all the substituents denoted by R are hydrogen. The reaction with lactone is started by low molecular weight polyols such as ethyleneglycol, 1,3-propanediol, 1,4-butanediol or dimethylol cyclohexane although other reactants, such as ethylenediamine, alkyl dialkanolamines or urea may be reacted with caprolactone.

Polylactamdiols prepared by the reaction, for example, of ε-caprolactam with low molecular weight diols are also suitable as relatively high molecular weight diols.

Aliphatic, cycloaliphatic and/or aromatic polyisocyanates containing at least 2 isocyanate groups per molecule are suitable as typical multifunctional isocyanates. The isomers or isomeric mixtures of organic diisocyanates are preferred. Suitable aromatic diisocyanates include phenylenediisocyanate, tolylenediisocyanate, tolylenediisocyanate, xylylenediisocyanate, biphenylenediisocyanate, naphthylenediisocyanate and diphenylmethanediisocyanate.

Owing to their high resistance to ultra violet light, (cyclo)aliphatic diisocyanates give rise to products which have a reduced tendency to yellowing. Examples of such diisocyanates include isophoronediisocyanate, cyclopentylenediisocyanate and the hydrogenation products of aromatic diisocyanates such as cyclohexylenediisocyanate, methylcyclohexylenediisocyanate and dicyclohexylmethanediisocyanate. Aliphatic diisocyanates are compounds of the formula

wherein r represents an integer from 2 to 20, in particular from 6 to 8, and the groups denoted by R, which may be identical or different, may be hydrogen or a lower alkyl group with 1 to 8 carbon atoms, preferably 1 or 2 carbon atoms. Examples include trimethylenediisocyanate, tetramethylenediisocyanate, pentamethylenediisocyanate, hexamethylenediisocyanate, propylenediisocyanate, ethylethylenediisocyanate, dimethylethylenediisocyanate, methyltrimethylenediisocyanate and trimethylhexanediisocyanate. Particularly preferred diisocyanates are isophoronediisocyanate and dicyclohexylmethanediisocyanate. The polyisocyanate component used for the formation of the prepolymer may contain a proportion of polyisocyanates having a higher valency, provided they do not give rise to gel formation. Triisocyanates which have proved to be useful are those which have been prepared by the trimerization or oligomerisation of diisocyanates or by the reaction of diisocyanates with polyfunctional compounds containing OH groups or NH groups. These include, for example, the biuret of hexamethylenediisocyanate and water, the isocyanurate of hexamethylenediisocyanate and the product of addition of isophoronediisocyanate to trimethylolpropane. The average functionality may be lowered, if necessary, by the addition of monoisocyanates. Examples of such chain breaking monoisocyanates are phenylisocyanate, cyclohexylisocyanate and stearylisocyanate.

Polyurethanes are generally not compatible with water unless special constituents are incorporated in them in the process of their synthesis and/or special steps are taken during their preparation. Thus a sufficiently high acid number is built into component B to ensure that the neutralized product will form a stable emulsion in water. This is achieved by means of compounds which contain two isocyanate reactive H groups and at least one group capable of anion formation. Hydroxyl groups and primary and/or secondary amino groups in particular may be used as isocyanate reactive groups. Carboxyl groups, sulphonic acid groups and/or phosphonic acid groups are groups capable of anion formation. Carboxylic acid groups or carboxylate groups are preferably used for this purpose. They should be so slow to react that the isocyanate groups in the diisocyanate preferentially react with the hydroxyl groups of the molecule. Alkanoic acids containing two substituents on the e carbon atom, for example, may be used for this purpose. The substituent may be a hydroxyl group or an alkyl group or, preferably, an alkylol group. These polyols have at least 1, generally 1 to 3 carboxyl groups in the molecule. They contain from 2 to about 25, preferably from 3 to 10 carbon atoms. Dihydroxypropionic acid, dihydroxysuccinic acid and dihydroxybenzoic acid are examples of such compounds. A particularly preferred group of dihydroxyalkanoic acids are the α, α-dimethylolalkanoic acids which are characterised by the structural formula

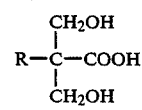

wherein R denotes hydrogen or an alkyl group with up to about 20 carbon atoms. Examples of such compounds are 2,2 dimethylolacetic acid, 2,2-dimethylolpropionic acid, 2,2-dimethylolbutyric acid and 2,2-dimethylolpentanoic acid. The preferred dihydroxyalkanoic acid is 2,2-dimethylolpropionic acid. Examples of compounds containing amino groups include α, δ-diaminovaleric acid, 3,4-diaminobenzoic acid, 2,4-diaminotoluenesulphonic acid and 2,4-diamino-diphenylether sulphonic acid. The polyol which contains carboxyl groups may constitute from 3 to 100% by weight, preferably from 5 to 50% by weight of the total polyol component in the isocyanate prepolymer.

This dihydroxyalkanoic acid is at least partly neutralized with a tertiary amine before the reaction with isocyanates in order to prevent a reaction with the isocyanates.

The quantity of ionizable carboxyl groups available as a result of the carboxyl group neutralization in the salt form

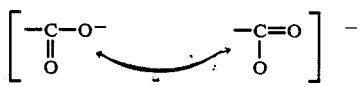

is generally at least 0.4% by weight, preferably at least 0.7% by weight, based on the solids content. The upper limit is about 6% by weight. The quantity of dihydroxyalkanoic acids in the unneutralized prepolymer results in an acid number of at least 5, preferably at least 10. The upper limit of the acid number is 60, preferably 40, based on the solids content.

The isocyanate prepolymers used according to the invention may be prepared by simultaneous reaction of the polyol or polyol mixture with a diisocyanate excess. Alternatively, the reaction may be carried out step wise in the prescribed sequence.

Examples are described in DE 26 24 442 and DE 32 10 051. The reaction temperature may be up to 150° C. and is preferably in the range of 50° to 130° C. The reaction is continued until virtually all the hydroxyl functions have undergone reaction.

The isocyanate prepolymer contains at least about 0.5% by weight of isocyanate groups, preferably at least 1% by weight NCO, based on the solids content. The upper limit is about 15% by weight, preferably 10% by weight, most preferably 5% by weight.

The reaction may be carried out in the presence of a catalyst such as organic tin compounds and/or tertiary amines. Organic solvents which do not contain Zerewitinoff active hydrogen may be added in order to keep the reactants in a liquid state and improve the reaction temperature control. Suitable solvents include, for example, dimethylformamide, esters, ethers such as diethyleneglycol-dimethylether, keto esters, ketones such as methylethylketone and acetone, ketones substituted with methoxy groups, such as methoxyhexanone, glycol ether esters, chlorinated hydrocarbons, aliphatic and alicyclic hydrocarbon pyrrolidones such as N-methylpyrrolidone, hydrogenated furans, aromatic hydrocarbons and mixtures thereof. The quantity of solvent may vary within wide limits and should be sufficient to form a prepolymer solution having a suitable viscosity. It is in most cases sufficient to use from 0.01 to 15% by weight of solvent, preferably 0.02 to 8% by weight of solvent, based on the solids content. If the solvents, which may be insoluble in water, boil at a lower temperature than water, they may be carefully distilled off by vacuum distillation or thin layer evaporation after the preparation of the urea-containing polyurethane dispersion. Higher boiling solvents should be to a large extent water soluble and remain in the aqueous polyurethane dispersion to facilitate coalescence of the polymer particles during film formation. A particularly preferred solvent is N-methylpyrrolidone, optionally used as a mixture with ketones such as methylethyl ketone.

The anionic groups of the isocyanate prepolymer are at least partially neutralized with a tertiary amine. The resulting increase in the dispersibility in water is sufficient for infinite dilution. It is also sufficient for stable dispersion of the neutralized polyurethane containing urea groups. Suitable tertiary amines are, for example, trimethylamine, triethylamine, dimethylaniline, diethylaniline and N-methylmorpholine. After neutralization, the isocyanate prepolymer is diluted with water to yield a finely divided dispersion. Shortly thereafter, the isocyanate groups still present are reacted with di- and/or polyamines containing primary and/or secondary amino groups as chain lengthening agents. This reaction results in further linkage and increase in the molecular weight. In order that optimum properties may be obtained, the competing reaction between amine and water with the isocyanate must be carefully adjusted (time, temperature, concentration) and carefully monitored to insure reproducible production. The chain lengthening agents used are preferably water soluble compounds as these increase the dispersibility of the polymer end product in water. Organic diamines are preferably used because they generally provide the maximum increase in molecular weight without causing gelling of the resin. If this is to be achieved, however, it is necessary to select a suitable ratio of amino groups to isocyanate groups. The quantity of chain lengthening agent is determined according to its functionality, the isocyanate content of the prepolymer and the duration of the reaction. The ratio of reactive amino groups in the chain lengthening agent to the isocyanate groups in the prepolymer should generally be less than 1:1 and is preferably in the range of from 1:1 to 0.75:1. The presence of excess active hydrogen, especially in the form of primary amino groups, may result in polymers with an undesirably low molecular weight.

The polyamines are mainly alkylene polyamines having 1 to 40 carbon atoms, preferably about 2 to 15 carbon atoms. They may carry substituents which are free from isocyanate reactive hydrogen atoms. Examples include polyamines having a straight chained or branched aliphatic, cycloaliphatic or aromatic structure and containing at least two primary amino groups. The following are examples of suitable diamines: ethylenediamine, propylenediamine, 1,4-butylenediamine, piperazine, 1,4-cyclohexyldimethylamine, hexamethylenediamine-(1,6), trimethylhexamethylenediamine, menthanediamine, isophoronediamine, 4,4'-diaminodicyclohexylmethane and aminoethylethanolamine. Preferred diamines include alkyl and cycloalkyldiamines such as propylenediamine and 1-amino-3-aminomethyl-3,5,5-trimethylcyclohexane.

Chain lengthening may be carried out at least partly with a polyamine which has at least three amino groups containing a reactive hydrogen atom. This type of polyamine may be used in such quantities that unreacted amine nitrogen atoms with one or two reactive hydrogen atoms are present after chain lengthening of the polymer. Suitable polyamines of this kind include diethylenetriamine, triethylenetetra-amine, dipropylenetriamine and dibutylenetriamine. Alkyl and cycloalkyl triamines such as diethylenetriamine are preferred polyamines. If the isocyanate content is very high, small proportions of monoamines such as ethylhexylamine may be added to prevent gelling in the process of chain lengthening. The chain lengthening agents used may also be diamines in which the primary amino group is protected as a ketimine and which only become reactive in the presence of water due to splitting off of the ketone.

Components (A) and (B) defined above form the aqueous-based binders of the coating compounds according to the invention. The aqueous coating compounds according to the invention may be obtained by mixing components (A) and (B). Component (A) may be neutralized before or after mixing. Neutralization renders the components sufficiently dilutable with water. The substances used for neutralization may be ammonia and/or amines (in particular alkylamines), amino alcohols and cyclic amines such as di- and triethylamine, dimethylaminoethanolamine, diisopropanolamine, morpholine or N-alkylmorpholines. Dilution with water to obtain the desired viscosity is carried out before and/or after the components (A) and (B) are mixed, depending on the added components.

The aqueous coating compounds according to the invention are preferably pigmented with color forming pigments. The coloring agents used may be, for example, those described in German standard DIN 55944, sheet 1 to 4 of November 1973. Commercial pigment preparations are also suitable. The coating compounds according to the invention are particularly suitable for the incorporation of effect pigments such as metal pigments (e.g. alubronzes) and/or pearly luster pigments and/or interference pigments, which result in excellent effect lacquers. The effect pigments such as the metal pigment or pearly luster pigments may be incorporated by, for example, simply mixing them into the aqueous binder, optionally with the addition of a proportion of solvents, water, dispersing agents and thickeners. Grinding up is not necessary.

If colored metal effect or uniform color shades are to be obtained, previous careful grinding up (dispersion) of the pigments with a grinding resin is necessary, e.g. in pearl mills. Suitable grinding resins are, for example, water dilutable polyester resins and amine-formaldehyde condensation resins such as melamine resins and/or acrylate. The quantity of resin paste added should be as small as possible but up to 20% by weight of the binder may be replaced if the pigments are difficult to wet. One suitable grinding resin consists of a copolymer obtainable by the reaction of (A) 80 to 95% by weight of a copolymer of
 (a) 0.5 to 40% by weight of N,N-di-$C_1$ $_{to}$ $_4$-alkylamino-$C_1$ $_{to}$ $_8$-alkyl(meth)acrylamides and/or a mixture of N,N-di-$C_1$ $_{to}$ $_4$-alkylamino-$C_1$ $_{to}$ $_8$-alkyl(meth)acrylates and N-substituted (meth)acrylamides and/or (meth)acrylamide in which the ratio of amino(meth)acrylates to amido(meth)acrylates should be in the range of from 1:2 to 2:1,
 (b) 10 to 40% by weight of hydroxy-$C_2$ $_{to}$ $_8$-alkyl(meth)acrylates and
 (c) 20 to 89.5% by weight of copolymerizable α, β-olefinically unsaturated compounds an
(B) 5 to 20% by weight of a polyisocyanate containing biuret, urethane or isocyanurate groups and containing unmasked and optionally also masked isocyanate groups.

The preparation of this polymer is described in the patent application of the same applicants, entitled "Pigment Dispersion And Its Use", filed on the same date as the present application.

Particularly suitable and preferred as grinding resin for pigments is also the resin described in the description of component (A) according to the invention. If the resin of component (A) is used as grinding resin, parts of component (A) may be used for this purpose or additional quantities of component (A) may be used as grinding resin. The use of component (A) as grinding resin is preferably carried out after partial neutralization and partial dilution with water. This is particularly important since it avoids the necessity of using a foreign binder which would in most cases have a low molecular weight and could possibly falsify the properties of the lacquer films obtained from the coating compounds according to the invention.

The usual inorganic or organic additives for influencing the flow properties may be added to the coating compounds according to the invention. Thus substances which act as thickeners include, for example, water soluble cellulose ethers such as hydroxyethyl cellulose, methyl cellulose or carboxymethyl cellulose and synthetic polymers containing ionic and/or associatively acting groups, such as polyvinylalcohol, poly(meth)acrylamide, poly(meth)acrylic acid, polyvinylpyrrolidone, styrene/maleic acid anhydride or ethylene/maleic acid anhydride copolymers and their derivatives as well as hydrophobically modified ethoxylated polyurethanes or polyacrylates. Particularly preferred are carboxyl group- containing polyacrylate copolymers having an acid number of from 60 to 780, preferably from 200 to 500, which may also be used for wetting the metal effect pigments.

Solvents and neutralizing agents such as, for example, those which have been described above for poly(meth)acrylate resins may be added to correct the flow properties and pH values and to improve the storage stability of the coating compounds according to the invention.

The coating compounds according to the invention contain as small a proportion of organic solvents as possible. This proportion may be, for example, less than 15% by weight.

The coating compounds according to the invention generally have a solids content of about 10 to 50% by weight. This solids content varies according to the purpose for which the coating compound is intended. For metallic lacquers, for example, the content is preferably 10 to 25% by weight. For uniformly colored lacquers the proportion is higher, for example 15 to 50% by weight.

The aqueous coating compounds according to the invention may be physically dried even at low temperatures, but conventional cross-linking agents may also be used, such as, for example, formaldehyde condensation products, e.g. melamine resins, and/or blocked isocyanates, optionally with the addition of catalysts. Curing may also take place after the surface has been coated with a conventional clear lacquer, in which case the coating compound may be predried or, preferably, the lacquer is applied wet in wet. When 2-component clear lacquers are used (e.g. acrylic-isocyanate and/or polyester-isocyanate), particularly advantageous properties with regard to water resistance, resistance to stone chipping, adherence and stability to weathering are already obtained at low curing temperatures, e.g. in the region of 80° to 130° C. For a 1- component clear lacquer, temperatures above 120° C. are preferred.

The thicknesses of the layers are preferably from 10 to 30 μm dry film thickness for coatings obtained from the coating compounds according to the invention and 30 to 60 μm when a clear lacquer is used in addition. According to the invention, "high solids" are preferably used as clear top coat lacquers. Coating with a clear lacquer is not absolutely necessary but is particularly advantageous in the motor car industry. The polymerization resin (A) may be used in combination with suitable cross-linking agents to serve as water dilutable clear lacquer.

By using binders which have not been pre-cross-linked, good levelling flow resulting in smooth surfaces is obtained with the coating compounds according to the invention. In addition, the bronze alignment in metallic lacquers is improved. The water resistance of the coatings obtained is excellent. When used in the motor vehicle sector, excellent resistance to stone chipping is obtained.

The water- containing and water dilutable coatings according to the invention have the advantage of not yellowing. They may be used both as base lacquers and as top coat lacquers. Their use as base lacquers is preferred. These base lacquers may be covered with a clear top lacquer after they have been predried and the two layers may then be dried (stove) together. Both the known, conventional solvent- containing lacquers, e.g. 1-component and 2- component clear lacquers (especially the 2- component high solids types) and water dilutable clear lacquers may be used as clear top coat lacquers. The coating compounds according to the invention provide good adherence to a wide variety of surfaces. The present invention accordingly also relates to the use of the aqueous coating compounds according to the invention for the formation of a coating on a substrate by application to the surface of the substrate, optionally covering with a layer of a clear lacquer dissolved in water or in organic solvents, and heating to temperatures of 60° to 150° C. The substrates are the usual articles coated with coating compounds of this type, in particular parts of motor vehicles which may previously have been coated with a primer or a filler.

The lacquer may be applied by the conventional methods used in the lacquer industry, e.g. spraying, knife coating, dipping or roller coating, and the possibility of electrostatic spraying by means of so called high rotation bells, as already mentioned above, should be particularly mentioned.

EXAMPLES

Preparation 1

Hydroxyl group- containing polymer resin (A1).
912 g of butoxyethanol are heated to 130° C. in a 3-necked flask in an inert gas atmosphere under reflux condensation and a mixture of
60 g of acrylic acid
165 g of hydroxyethyl acrylate
145 g of n-butyl acrylate
60 g of isobutyl acrylate
550 g of methyl methacrylate
20 g of butanediol diacrylate
6 g of tert.-butyl-peroxy-2-ethylhexanoate,
is then slowly added from a dropping funnel within three hours with vigorous stirring while the reaction temperature is maintained at 130° C. The reaction mixture is after-initiated twice with tert.-butyl-peroxy-2-ethylhexanoate at an interval of two hours and the resin is then polymerized to completion.
Final values:
solids content: 50.4% by weight (30 min. heating to 180° C.)
acid number: 48 mg KOH per g of solid resin
viscosity: 21 Pa.s at the solids content.
When a test for a Tyndall effect was carried out on the neutralized resin diluted with water to 15%, using unpolarized monochromatic laser light, the result was negative.

Preparation A-2

Hydroxyl group- containing polymer resin (A-2)
Method of preparation as for Al but with the following composition at 120° C.:
1927 g of butyoxyethanol
92 g of methacrylic acid
331 g of hydroxypropyl acrylate
462 g of isobutyl acrylate
1134 g of methyl methacrylate
34 g of hexanediol diacrylate
14 g of tert.-butyl-peroxy-2-ethoxyhexanoate.
Final values:
solids content: 51.6% by weight (30 min at 180° C.)
acid number: 29 mg KOH per g of solid resin
viscosity: 29 Pa.s at the solids content.
Tyndall effect: negative.

Preparation 2

Aqueous polyurethane dispersion (B).
250 g of a straight chained polyester (synthesized from adipic acid, isophthalic acid and hexanediol; OH number 77, acid number 10) are heated to 70° C. together with 80 g of methylethyl ketone and 53.3 g of N-methylpyrrolidone in a reaction vessel equipped with stirrer, internal thermometer, heating means and reflux condenser, and 74 g of hydrogenated bisphenol A and 28.3 g of dimethylolpropionic acid are added at this temperature. The reaction mixture is heated to 120° C. and stirred at this temperature for half an hour. 146.7 g of hexamethylenediisocyanate are then added at 70° C. After an exothermic phase (temperature <90° C.), the reaction mixture is kept at 75° C. until the residual isocyanate numbers are less than 1.8. The resin mixture is dispersed while still warm in 891 g of deionized water and 23.5 g of triethylamine with vigorous stirring. 10.5 g of propylene-1,3-diamine in 75 g of deionized water are added 5 minutes after all the resin has been added, and stirring of the reaction mixture is continued for 1 hour.

A translucent, aqueous dispersion having the following characteristics was obtained:
solids content: 30%
viscosity (20° C.): 109 mPa.s
pH: 9.8
acid number: 27 (mg KOH per g of solid resin).

EXAMPLE 1

Preparation of a metallic base lacquer
Ammonia and water are added with stirring to 1000 g of the polyacrylate resin Al mentioned in example of preparation 1 to form a solution having a solids content of 20% and a pH of 7.3. This solution is left at room temperature for 24 hours and the pH is readjusted to 7.3 by the addition of ammonia if necessary.

At the same time, 40 g of a commercial aluminium bronze having an aluminium content of 65% is made up into a paste with a mixture of 10 g of water and 14 g of butoxyethanol.

A mixture of 434 g of the polyacrylate resin solution described above, 137 g of completely salt free water and 4 g of ammonia is run at a uniform rate over a period of 15 minutes into 64 g of the above described bronze paste with stirring (about 800 revs per min.), and stirring is then continued for a further 15 minutes.

124 g of a commercially obtainable polyurethane dispersion having a solids content of 30%, followed by 237 g of a commercial 3.4% thickener solution based on a polyacrylate dispersion are then added with stirring and the pH is adjusted to 7.3–7.5 with ammonia.

EXAMPLE 2

Formation of lacquer coat in metallic

The metallic base lacquer described in Example 1 is applied with a flow cup gun to a zinc phosphatized car body panel which has been lacquered with an electrodip primer and a filler so that after drying for 5 minutes at 20° C. and 5 minutes at 80° C. the metallic base lacquer has a dry film thickness of about 15 μm. This is then covered with a commercial clear lacquer (e.g. a high solid, 2-component lacquer) followed by stoving at 130° C. for 30 minutes. The dry film thickness of the clear lacquer is about 40 μm. The lacquer surface thus obtained has a fine, uniformly light metal effect. The lacquer film is cut down to the filler with a fine knife by the so called ladder cut and tested eight times by the so called adhesive tape tear-off method. No loss of adhesion is recorded. Another test plate prepared as described above is kept in water at a temperature of 40° C. for 120 hours. After a reconditioning phase of 1 hour, the lacquer film is found to be free from blisters and without crinkling or loss of gloss.

EXAMPLE 3

Preparation of a tinting paste

Ammonia and water are added in such quantity to the polyacrylate resin A2 described in example of preparation 1 that a solids content of 38% and a pH of 8.0 are obtained. 465 g of this resin solution are predispersed with 155 g of an organic vat dye (scarlet GO, transparent, Hoechst) and 380 g of completely desalted water for 15 minutes in a dissolver at 21 m/sec and then ground up in a pearl mill for 90 minutes at temperatures in the region of 60° C. This color paste has a high transparency and is eminently suitable for tinting water-dilutable metallic base lacquers.

EXAMPLE 4

Preparation of a white primer

Ammonia and water are added in such quantities to 745 g of polyacrylate resin A1 described in Example of preparation 1 that a solids content of 37.2% by weight and a pH of 8.0 are obtained.

80 g of water, 20 g of a 50% solution of a symmetric acetyleneglycol in butylglycol and 300 g of titaniumdioxide are incorporated in 400 g of this polyacrylate resin solution in a dissolver and dispersed for 10 minutes at 21 m/sec. After the mixture has been left to stand overnight, it is dispersed in a pearl mill for 20 minutes at temperatures in the region of 40° C. and a further 150 g of the above described 37.2% polyacrylate resin solution and 50 g of water, based on 800 g of grinding material, are added. In addition, 400 g of polyurethane dispersion B described in example of preparation 2 are added with stirring and the viscosity is then adjusted to 21 DIN-4-sec with completely salt free water.

This white base coat is applied by means of a flow cup gun to a zinc phosphatized standard plate covered with filler to form a base coat layer having a dry film thickness of about 30 μm which is then dried at room temperature for 5 minutes and at 80° C. for 5 minutes. The surface is then covered with a solvent-containing 2-component clear lacquer (high solid) and stoved at 130° C. for 30 minutes. A pure white, high gloss lacquer film results.

EXAMPLE 5

Preparation of a metallic base lacquer

Polyurethane dispersion B described in Example of preparation 2 is diluted to a solids content of 20% with fully desalted water. 450 g of this 20% dispersion together with 420 g of polyacrylate resin solution A1 mentioned in Example of preparation 1 is adjusted to pH 7.9 with ammonia with the addition of 170 g of completely salt free water and the mixture is diluted with a further 417 g of completely salt free water.

40 g of a commercial aluminium bronze having an aluminium content of 65% are made up into a paste with a mixture of 10 g of completely salt free water and 14 g of butoxyethanol.

620 g of the binder mixture described above are run into 64 g of this bronze paste at a uniform rate over 15 minutes with stirring. The mixture is then stirred for a further 15 minutes at about 800 revs per min. A mixture of 289 g of completely salt free water and 27 g of a commercial thickener based on a polyacrylate dispersion and having a solids content of 30% is then run in with stirring and stirring is continued for a further 15 minutes. The pH is readjusted to 7.3–7.6 with ammonia if necessary and adjusted to a spraying viscosity of about 25 DIN-4-sec by the addition of completely salt free water. This metallic base lacquer is applied to a hub cap of polyamide with a flow cup gun to form a film having a dry film thickness of about 15 μm. After exposure to air (about 5 minutes at room temperature) and drying for 5 minutes at 80° C., the surface is over lacquered when cool with a conventional solvent-containing clear lacquer (2-component high-solid) to form a layer having a dry film thickness of about 40 μm, and this is dried at 80° C. for 45 minutes. A high gloss metallic effect coating results.

We claim:

1. An aqueous coating composition of a non-yellowing film forming material based on water dilutable polymeric binders comprising of a mixture of
   (A) 90 to 40% by weight of a poly(meth)acrylate resin which contains hydroxyl groups, wherein said resin (A) has:
      (a) a number average molecular weight (Mn) of from 10,000 to 500,000,
      (b) a glass transition temperature of from −50° to +150° C.,
      (c) an acid number of from 0 to 80 (mg KOH per g of solid resin),
      (d) a hydroxyl number of from 60 to 250 (mg KOH per g of solid resin) and
      (e) A viscosity of from 5 to 100 Pa.s (determined on a 50% solution in butoxyethanol at 25° C.), and
   (B) 10 to 60% by weight of an anionic polyurethane resin dispersion, having an acid number of from 5 to 50 wherein: the quantitative percentage proportions of (A) and (B) are based on their solids content of which the sum amounts to 100%, and
   (C) pigments.

2. An aqueous coating composition according to claim 1, which also contains conventional solvents, auxiliary substances, and additives such as neutralizing agents, thickeners and crosslinking agents.

3. An aqueous coating composition according to claim 1, wherein component (A) is obtained by free radical polymerization of
   (a) 0 to 12% by weight of α,β-unsaturated carboxylic acids,
   (b) 10 to 65% by weight of monomers which contain hydroxyl groups wherein said monomers are capable of being incorporated by polymerization,
   (c) 0.1 to 7% by weight of polyunsaturated monomers, and
   (d) 16 to 90% by weight of monounsaturated monomers which contain no reactive groups other than a double bond.

4. An aqueous coating composition containing a film forming material based on water dilutable binders which are a mixture of:
   (A) 90 to 40% by weight of hydroxyl group containing poly(meth)acrylate resin having
      (a) a number average molecular weight of from 10,000 to 500,000,
      (b) an acid number of from 0 to 80 (mg KOH per g of solid resin), and
      (c) a hydroxyl number of from 60 to 250 (mg KOH per g of solid resin), and
   (B) 10 to 60% by weight of an anionic polyurethane dispersion the quantitative proportions of (A) and (B) being based on their solids content and their sum always amounting to 100%, and
   (C) pigments.

5. Aqueous coating compositions according to claim 4 wherein component (A) is obtained by free radical polymerization of
   (a) 0 to 12% by weight of α,β-unsaturated carboxylic acids,
   (b) 10 to 65% by weight of hydroxyl group-containing monomers capable of being incorporated by polymerization,
   (c) 0. to 7% by weight of polyunsaturated monomers, and
   (d) 16 to 90% by weight of monounsaturated monomers which contain no reactive groups other than a double bond.

* * * * *

UNITED STATES PATENT AND TRADEMARK OFFICE
CERTIFICATE OF CORRECTION

PATENT NO. : 4,880,867
DATED : November 14, 1989
INVENTOR(S) : Gobel, et al

It is certified that error appears in the above-identified patent and that said Letters Patent is hereby corrected as shown below:

ON THE TITLE PAGE

Item [75], Inventors: After Armin delete [gobel] and insert -- Göbel --, after Knut delete [graff] and insert -- Gräf --.

Signed and Sealed this

Tenth Day of August, 1993

Attest:

MICHAEL K. KIRK

Attesting Officer

Acting Commissioner of Patents and Trademarks